Nov. 2, 1965 H. K. DUNN 3,215,109
SIGNAL CONTROLLED STEERING SYSTEM
Filed June 22, 1943 3 Sheets-Sheet 1
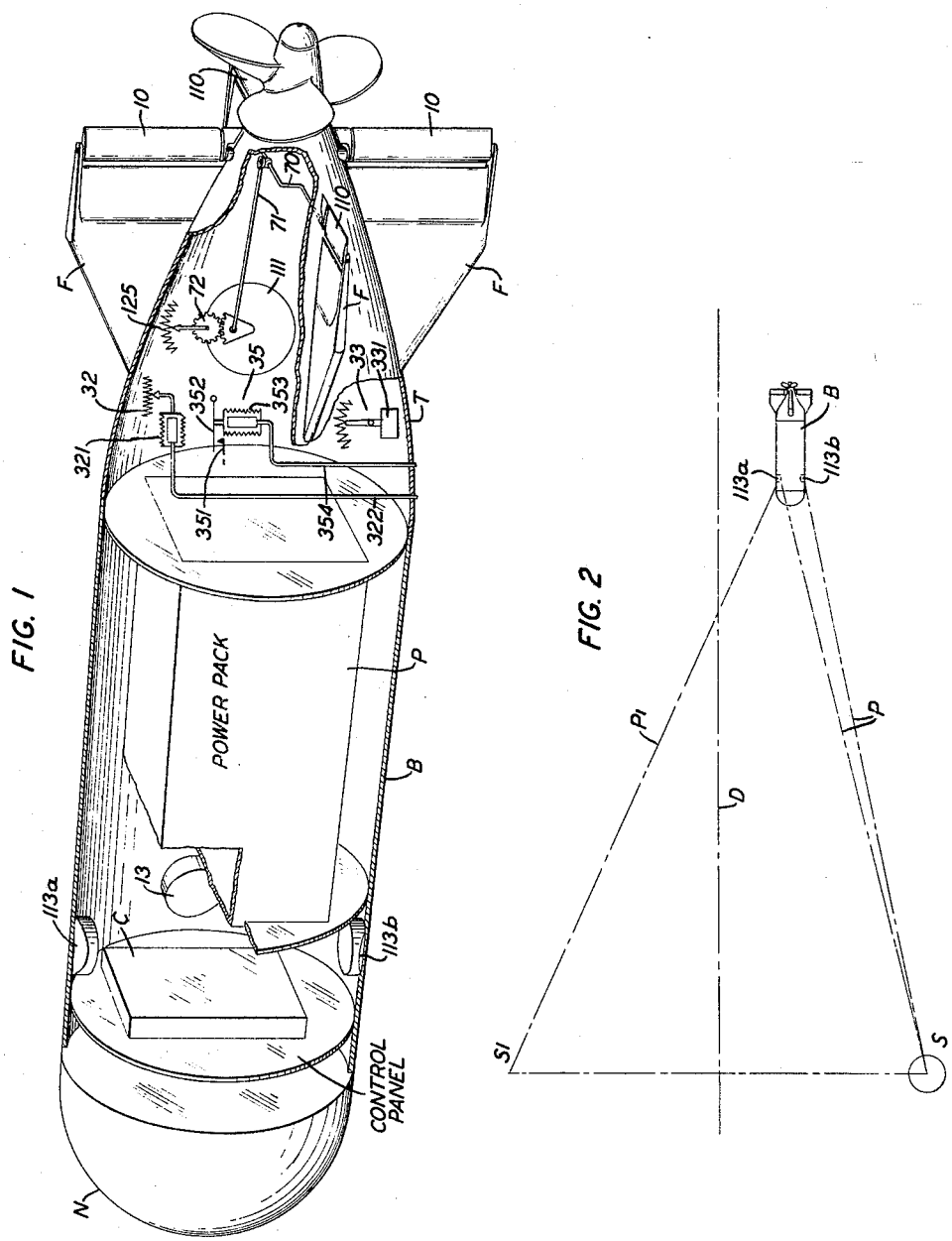
INVENTOR
H. K. DUNN
BY
Walter E. Kiesel
ATTORNEY

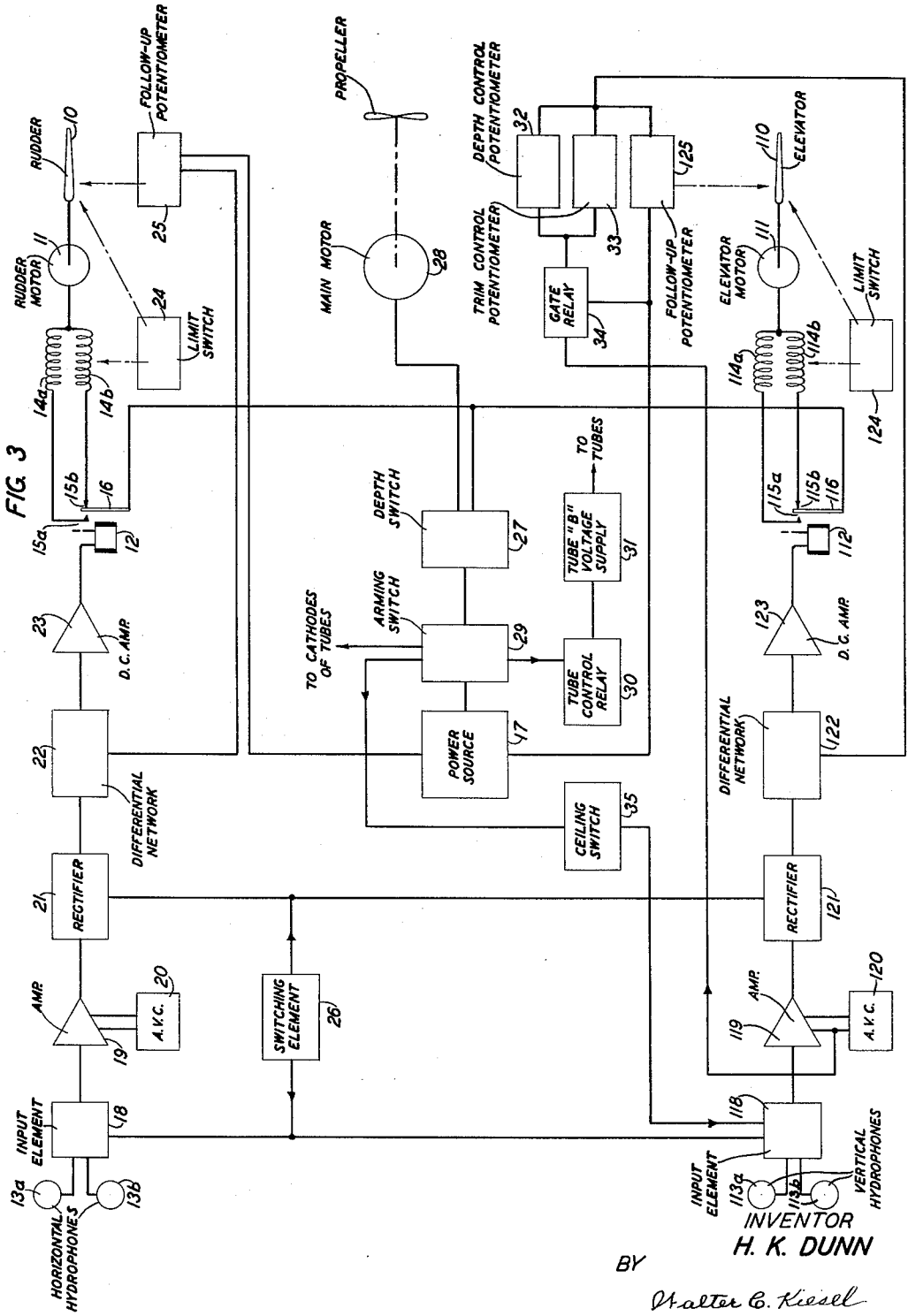

United States Patent Office 3,215,109
Patented Nov. 2, 1965

3,215,109
SIGNAL CONTROLLED STEERING SYSTEMS
Hugh K. Dunn, Murray Hill, N.J., assignor to Bell Telephone Laboratories, Incorporated, New York, N.Y., a corporation of New York
Filed June 22, 1943, Ser. No. 491,794
25 Claims. (Cl. 114—23)

This invention relates to signal controlled steering systems for moving bodies and more particularly to sonically controlled steering systems for torpedoes such as disclosed, for example, in the application Serial No. 491,797, filed June 22, 1943, of John C. Steinberg.

In general, a sonically controlled steering system for torpedoes of the general organization disclosed in the above-identified application comprises a pair of hydrophones mounted on opposite sides of the body of the torpedo, that is, on either the port and starboard sides or the top and bottom of the body, so constructed and arranged that the relative intensities of compressional wave signals at these hydrophones are related at any instant to the angular location of the source of the signals, such as a submarine, with respect to the longitudinal axis of the torpedo, at that instant. The system comprises also a control circuit for resolving the signals received by the hydrophones into a control signal in accordance with the character of which a rudder is deflected to steer the torpedo toward the signal source, e.g. the submarine. Specifically, the steering information in accordance with which the rudder for steering the torpedo horizontally is controlled may be derived by resolving the outputs of two hydrophones mounted on the port and starboard sides of the torpedo, to produce a potential in accordance with the polarity of which the rudder is deflected in one direction or the other. Similarly, the steering information for controlling the elevator to steer the torpedo vertically may be obtained by combining the outputs of two hydrophones mounted on the top and bottom of the torpedo, to produce a potential in accordance with the polarity of which the elevator is deflected in one direction or the other.

In steering systems of the general organization outlined above, false operation of the elevator may occur due to the image of the signal source resulting from reflections of the signals at the sea surface. For example, a condition may be produced where, when the submarine from which the signals emanate is at a greater depth than the torpedo, the relative signal intensities at the two hydrophones in the elevator control circuit may be varied, due to the reflection of the signals at the sea surface, in such manner as to cause the torpedo to be steered upwardly toward the surface instead of downwardly toward the submarine.

Also in some cases, a sonically steered torpedo may be launched at such distance from the source, e.g. submarine, of the signals in accordance with which it is adapted to be steered that the signal intensities at the hydrophones may be below a prescribed level or below the level requisite to realize operation of the rudder and elevator control systems. It is desirable, therefore, that the torpedo be caused to travel at a preassigned depth in the absence of signal control and to have stability of motion at this depth.

Further, in order to obtain uniform and smooth rudder and elevator action and to assure accurate guiding of the torpedo to the source of the signals in accordance with which the torpedo is adapted to be steered, it is desirable that the rudder and elevator control be such as to provide continuous steering.

One general object of this invention is to improve the rudder and elevator controls in a moving body adapted to be steered in accordance with signals received at the body.

More specifically, objects of this invention are to:

Increase the rudder and elevator control sensitivity in a moving body adapted to be steered in accordance with signals received at the body;

Prevent false operation of the elevator control system in a sonically guided torpedo;

Obtain controlled travel of a sonically guided torpedo at a preassigned depth of submersion whenever the sonic signals in accordance with which the torpedo is adapted to be guided are of less than a prescribed intensity;

Improve the stability of a self-propelled sonically steered torpedo when the intensity of the sonic signals is below a prescribed level and the torpedo is being steered at a preassigned depth;

Vary, in a sonically steered torpedo, the control signal in accordance with which the rudder or elevator is deflected, proportionately to the deflection of the rudder or elevator so that continuous steering is realized; and Simplify rudder and elevator control systems for moving bodies wherein the rudder and elevator are subject to deflection in accordance with several signals or controls.

In one illustrative embodiment of this invention, a torpedo steering control system of the general organization described hereinabove comprises individual reversible motors for deflecting the rudder and elevator, the direction of rotation of each motor, and hence the direction of deflection of the rudder or elevator, being controlled in accordance with the polarity of a control potential, for example the potential into which the outputs of the respective pair of hydrophones is resolved.

In accordance with one feature of this invention, the direction of rotation of each motor is determined by a differential relay adapted to determine the direction of energization of the motor windings and the relay is energized in accordance with the output of a sensitive direct current amplifier, the output of the amplifier being controlled in accordance with the amplitude and polarity of the control potential, for example the potential into which the outputs of the respective pair of hydrophones is resolved. In one specific arrangement the direct current amplifier comprises two electron discharge devices connected for push-pull operation and the input circuit for the amplifier comprises a resistance bridged across the control electrodes of the two devices, the potential aforenoted being impressed upon this input circuit.

In accordance with another feature of this invention, means are provided for preventing operation of the elevator in accordance with signals received by the hydrophones in the elevator control system whenever the torpedo is at or tends to rise above a preassigned depth of submersion.

In accordance with still another feature of this invention, means are provided for controlling the elevator to steer the torpedo at a prescribed depth whenever the signals received by the hydrophones in the elevator control system are below a preassigned intensity. In one form, this means comprises a pair of potentiometers in the input circuit for the amplifier in the elevator control system, one of the potentiometers being hydrostatically controlled and effective to vary the potential across the input resistor for the amplifier to produce deflection of the elevator so that the torpedo travels at the prescribed depth and the other of the potentiometers being pendulum-controlled and effective to vary the potential noted to maintain the trim of the torpedo while it is traveling at this depth or to make it approach this depth in a stable manner. A suitable relay energized in accordance with the outputs of the hydrophones is provided to render the potentiometers ineffective to control the elevator when the signals received by the hydrophones are of at least the preassigned intensity.

In accordance with a further feature of this invention, means are provided for varying the potential across the input resistor of the direct current amplifier proportionately to the deflection of the rudder or elevator thus to tend to maintain balance in the input circuit whereby continuous steering, that is rudder or elevator deflection proportional to the sonic signal differential, is realized. In one specific arrangement, this means includes a potentiometer mechanically coupled to the rudder or elevator and connected in the input circuit of the direct current amplifier.

In accordance with a still further feature of this invention, the several potentiometers above mentioned and other control potentiometers that may be employed are connected in parallel with one another and a common potential source to constitute a single element associated with the input circuit for the direct current amplifier. Suitable variable resistances may be provided in association with the several potentiometers to adjust the relative sensitivities of the several controls effected thereby.

The invention and the above-noted and other features thereof will be understood more clearly and fully from the following detailed description with reference to the accompanying drawing in which:

FIG. 1 is a perspective view partly in section and partly diagrammatic of a torpedo including a steering control system illustrative of one embodiment of this invention;

FIG. 2 is a diagram illustrating generally the relation of the torpedo, the source in accordance with the signals emanating from which the torpedo is adapted to be guided and the image of this source due to reflections of the signals at the sea surface;

FIG. 3 is a block diagram of an elevator and rudder control system illustrative of one embodiment of this invention.

Figure 4:
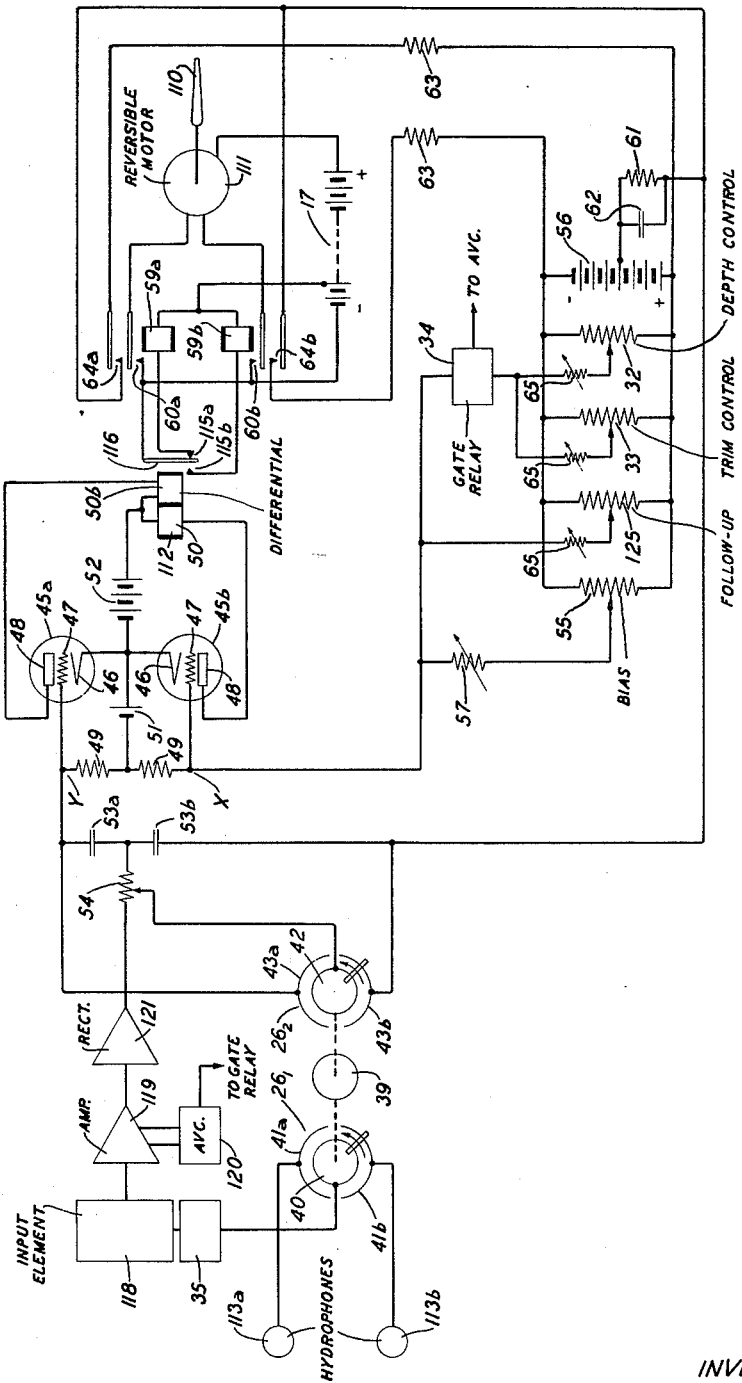
FIG. 4 is a detailed circuit diagram of an elevator control system of the configuration shown in FIG. 3.

Referring now to the drawing, the torpedo illustrated in FIG. 1 comprises a dome-shaped nose N in which an explosive charge is carried, a cylindrical body portion B in which a power pack P is mounted, and a tail portion T on which the horizontal and vertical fins F are fixed. Extending backwardly from adjacent the fins F are the vertical rudder 10 and horizontal rudder or elevator 110, each of which comprises two similar parts, as shown, mechanically coupled to one another to be deflected in unison. The horizontal rudder or elevator parts are connected by a yoke piece 70 which is coupled to a motor 111 by a suitable gearing or drive and a connecting rod 71, the motor being of the reversible type and operable to deflect the elevator 110 in opposite directions.

As described in detail hereinafter, the motor 111 is adapted to be controlled in accordance with the outputs of a pair of vertically aligned hydrophones 113a and 113b, which are mounted on the body B, the elevator motor control circuit including a plurality of instrumentalities mounted on the control panel C, a follow-up potentiometer 125, a depth control potentiometer 32 and a trim control potentiometer 33.

The follow-up potentiometer 125 has its contact arm geared to the connecting rod 71, as indicated at 72, so that the arm moves from its center position proportionately to the deflection of the elevator 110 and the direction of its motion is related to the direction of deflection of the elevator.

The depth control potentiometer 32 has its contact arm mechanically associated with a bellows 321 which is expanded and contacted in accordance with the pressure supplied thereto by way of a pipe 322 having communication with the sea by way of a port in the body B of the torpedo. The pressure acting upon the bellows will be proportional, of course, to the depth to which the torpedo is submerged at any instant and is so constructed that the contact arm of the potentiometer is at its center position when the torpedo is at a preassigned depth.

The trim control potentiometer 33 has its contact arm pivoted, the position of the arm being pendulum-controlled by a weight 331 and the potentiometer being so arranged that when the torpedo is level, the contact arm is at its center position.

The torpedo comprises also a ceiling switch 35 which, similarly to the depth control potentiometer 32, is hydrostatically operated. It comprises a contact 351, an armature 352 and a bellows 353 which is coupled mechanically to the armature 352 and the interior of which has communication with the sea by way of a pipe 354 extending to a port in the body B. The pressure acting upon the bellows will be proportional, of course, to the depth of submersion of the torpedo and the bellows is so constructed that it moves the armature 352 out of or into engagement with the contact 351 whenever the torpedo is submerged to less than a preassigned depth, to disable the sonic control circuit for the elevator.

The vertical rudder 10 is adapted to be controlled in accordance with signals received by a second pair of hydrophones 13, only one of which is shown in FIG. 1, mounted in alignment on opposite sides of the body B. In order to simplify the drawing, components of the rudder control system have been omitted from FIG. 1. Also in order to simplify the drawing, components of the propeller driving system have been omitted from FIG. 1.

The general organization of the rudder and elevator steering systems is shown diagrammatically in FIG. 3. The apparatus for steering the torpedo horizontally comprises the rudder 10, a motor 11 coupled to the rudder by a suitable gearing or drive and connecting rod, a relay 12 for controlling the energization of the motor, a pair of substantially identical hydrophones 13a and 13b and a control or resolving circuit for causing operation of the relay in accordance with the relative outputs of the hydrophones 13a and 13b to effect operation of the motor 11 and the rudder 10 in such manner as to steer the torpedo toward that side thereof on which the hydrophone having the greater output, at any particular time, is located. When the hydrophones have equal outputs or when no signals are received by the hydrophones, the rudder is maintained generally in central position.

The hydrophones 13a and 13b may be of any one of a number of well-known types and, advantageously, are designed to be particularly responsive to signals of a preassigned frequency. In one specific and illustrative construction, these hydrophones are of the piezoelectric type and are resonant at a frequency of 24 kilocycles. The motor 11 may be of the series type having field windings 14a and 14b each of which is connected to a corresponding contact 15a or 15b on the relay 12, the latter having an armature 16 which is connected to the power supply source 17 in a manner described hereinafter. The windings 14a and 14b are effective, when energized, to rotate the motor in opposite directions. The relay 12 may be constructed in such manner that normally, i.e., in the absence of a current in the relay winding, one of the contacts, for example contact 15b, is closed, or so that neither contact is closed.

The hydrophones 13a and 13b are connected to an input element 18, the output of which is fed to a high frequency amplifier 19 provided with automatic gain control 20. Advantageously the input element 18 is tuned to the same frequency to which the hydrophones are resonant. The output of the amplifier 19 is supplied to a rectifier 21. The rectifier output is fed to a differential or resolving network 22 which serves to resolve the amplified and rectified outputs of the two hydrophones in combination into a direct current potential, the polarity of which is dependent upon the relative magnitudes of these outputs. This potential is impressed upon the control element of a direct current amplifier 23, which controls the energization of the relay 12.

Associated with the rudder 10 are limit switches 24, which act upon the field winding circuits to limit deflection of the rudder in either direction to a predetermined angle. A follow-up potentiometer 25, the function of which will be described hereinafter, is coupled mechanically to the rudder 10 and is connected electrically to the power source 17 and differential network 22.

A low frequency switching element 26, which may be of the mechanical type as described hereinafter and disclosed in the application Serial No. 491,796, filed June 22, 1943, of Lester M. Ilgenfritz and Hilbert R. Moore or of the electronic type such as disclosed in the application Serial No. 491,795, filed June 22, 1943, of Donald D. Robertson, is connected to both the input element 18 and the rectifier 21 and serves to connect the hydrophones 13a and 13b alternately to the amplifier 19 and to operatively associate the rectifier 21 with two elements of the differential network 22 alternately and in synchronism with the connection of the hydrophones to the amplifier. In an illustrative system wherein the hydrophones are tuned to 24 kilocycles, the switching element 26 may have a frequency of the order of 225 cycles per second. By virtue of the action of the switching element 26, each hydrophone is connected to a corresponding one of the network elements, the connection of the hydrophones to their respective units being alternate. Stated in another way, by virtue of the action of the switching element, conductive paths are established alternately, at the frequency of the element 26, between the hydrophones 13a and 13b and the respective elements of the differential or resolving network 22.

The general operation of the horizontal steering apparatus will be understood from the following discussion. For convenience of discussion the hydrophone 13a may be considered as the port hydrophone, and the hydrophone 13b as the starboard hydrophone and the relay 12 is assumed to be so constructed and arranged that normally the contact 15b is closed and energization of the winding 14b results in starboard rudder. Assuming that the armature 16 to power supply source 17 circuit is closed and the main motor is operating, in the absence of energization of the hydrophones 13 by a signal, starboard rudder will result. Movement of the rudder will actuate the follow-up potentiometer 25 so that the differential network 22 will be energized to apply to the control element of the amplifier 23 such potential that the relay 12 operates to close contact 15a and the circuit through the winding 14a is closed. The motor 11 will then rotate in the opposite direction to produce port rudder. By action of the follow-up potentiometer upon the differential network 22, the amplifier 23 will be controlled so that the relay 12 is deenergized and consequently the contact 15b is closed to result in reversal of the direction of rotation of the motor and deflection of the rudder. This action is repeated, in the absence of a signal, so that port rudder and starboard rudder are produced alternately and the rudder hunts about its center position. The time constants and parameters involved are adjusted to produce a desired period of oscillation of the torpedo about the direction in which it was projected initially. Advantageously, the period of oscillation is made moderately short. For example, if the torpedo has a normal travel speed of twelve knots, the constants and parameters noted may be correlated to produce a period of oscillation corresponding to a travel of seven feet.

When a signal is received by the hydrophones 13a and 13b, that is, when compressional waves such as sonic waves emanating from a submarine are incident upon the hydrophones, the hydrophones take over control of the operation of the rudder. If the source of the compressional waves is dead ahead of the torpedo, the outputs of the two hydrophones are equal and the torpedo stays on course, i.e., directed toward this source. However, if this source is to one side of the line along which the torpedo is traveling, the intensities of the signal picked up by the two hydrophones will be different due to the shielding or shadow effect of the torpedo body. Assume, for example, that the submarine or other source of compressional waves is to the port side, either fore or aft, of the torpedo, of the directional line along which the torpedo is traveling when the signal is received by the hydrophones. The output of hydrophone 13a, then, will be greater than that of hydrophone 13b. The outputs of the two hydrophones, as amplified by amplifier 19, are fed alternately to the differential or resolving network 22. In this network, the outputs are combined differentially to produce a direct current potential applied to the control element of the direct current amplifier 23. When the output of hydrophone 13b is greater than that of the hydrophone 13a, the potential noted is negative and the relay 12 is operated to close contact 15b and, when the output of hydrophone 13a is the greater, the potential noted is positive, and the relay 12 is energized to close the contact 15a. Thus, if the submarine or compressional wave source is to the port side, as has been assumed for the instant discussion, the relay 12 operates to close the circuit for winding 14a and the motor 11 is driven in the direction to produce port rudder, that is to steer the torpedo to the port side. Deflection of the rudder 10 in this manner actuates the potentiometer 25 to produce an effect which will be described in detail hereinafter. Suffice it to say for purposes of present discussion, that as long as the compressional wave source is to the port side of the torpedo, port rudder will be produced and the torpedo steered accordingly, and the potentiometer 25 operates to produce continuous steering.

When, by the steering action described above, the course of the torpedo is altered to make its direction of travel directly toward the submarine or compressional wave source, the outputs of the hydrophones become equal, the resultant of the outputs as combined by the differential network 22 become zero, the rudder 10 is centered and the torpedo is held on course toward the submarine or source.

If the submarine or compressional wave source were originally to the starboard side of the original direction of projection or travel of the torpedo, the output of the hydrophone 13b would be greater than that of the hydrophone 13a and the torpedo would be steered toward starboard, in like manner as the steering to port described above, until it is on course toward the submarine or compressional wave source.

It will be understood, of course, that if the submarine or other compressional wave source moves, i.e., alters its course, the pick-ups of the hydrophones 13 will vary likewise and the rudder will be deflected accordingly to steer the torpedo continuously toward the submarine or source. It will be understood also that deflection of the rudder is effected to steer the torpedo toward the signal source whether this source is ahead of or behind the torpedo. If the signal source is dead astern of the torpedo when the latter is launched an unstable equilibrium exists even though the outputs of the horizontal hydrophones may be equal for this case, so that slight yaw of the torpedo results in deflection of the rudder 10 and the torpedo is turned until the signal source is dead ahead of the torpedo.

The control of the gain of the amplifier 19 by the automatic gain control 20 is in accordance with the greater of the two hydrophone outputs at any instant. As a result of the gain control, the hydrophone outputs are amplified to a substantially constant level so that in the differential network the two hydrophone outputs are combined and resolved on a relative rather than an absolute magnitude basis. Hence, the design requirements for the direct current amplifier and the relay 12 are simplified.

The torpedo has a predetermined negative buoyancy and it has been found desirable that the energizing circuits for the rudder and main motors be rendered operative only when the torpedo has submerged to a predetermined depth. This is realized, in the system shown in the drawing, by a depth switch 27 connected between the source 17 and the main motor 28 and armature 16 of the relay 12, the depth switch 27 being mounted on the torpedo body and hydrostatically operated to close the rudder and main motor circuits when the torpedo reaches a preassigned level after being projected into the sea. The depth switch 27 is associated with the power source 17 by way of an arming switch 29 which operates automatically when the torpedo is projected to close certain preliminary circuits, to close the cathode heater circuits for the several discharge devices included in the apparatus, and to cause operation of the relay 30 by way of which anode and grid potentials are applied to the discharge devices from the B voltage supply 31. Once operated the depth switch 27 remains closed, no matter what depth may be encountered subsequently.

The torpedo is steered vertically by an elevator 110 and an associated control system which is basically the same as that for the rudder control system described hereinabove but which includes, in addition, other controls described hereinafter. In the drawing, the elements of the elevator control system corresponding to those of the rudder control system are designated by the same numeral increased by 100 as the corresponding elements in the rudder control system.

The elevator control circuit operates in generally the same manner as the rudder control system as described above except, of course, that the hydrophones 113 are mounted on the top and bottom of the torpedo and the relative responses thereof are resolved to control the travel of the torpedo in the vertical direction. It is desirable, for reasons noted hereinafter, that, in the absence of a signal or when the signals received by the hydrophones 113 are below a certain intensity, the torpedo travel at a preassigned level. To this end, there are provided a depth control potentiometer 32 and a trim control potentiometer 33 which are associated with the differential network 122. The depth control potentiometer 32 is actuated hydrostatically as described hereinabove and varies the potential applied to the control element of the direct current amplifier 123 in such manner as to cause actuation of the relay 112 to keep the torpedo traveling at the prescribed level. The trim control potentiometer 33 is operated by a suitable pendulum, as noted hereinabove, and is effective to maintain trim of the torpedo while the latter is traveling at the prescribed level or to determine an angular departure from level trim proportional to the departure of the torpedo from the prescribed level.

When signals are received by the vertical hydrophones 113 or if desired when the received signals are of at least a minimum intensity, the depth and trim potentiometers 32 and 33, respectively, are rendered inoperative by a gate relay 34 which is energized by way of the automatic gain control 120 and the torpedo is then steered vertically in accordance with the signals as resolved in the elevator control circuit.

In some cases it is desirable that the torpedo be prevented from rising above a certain minimum level, for example, to prevent the torpedo from rising to the surface or to maintain it always at a depth below the keel level of surface ships that may be in the vicinity of the area in which the torpedo is launched. For this purpose, a hydrostatically operated ceiling switch 35 may be provided to disable the elevator sonic control circuit whenever the depth of submersion of the torpedo is less than a preassigned distance. This switch may be connected, for example, between the input element 118 and the power source 17 by way of the arming switch 29 to impress a blocking potential upon a control element in the input element 118 or it may be associated with the input element 118 in such manner as to open-circuit the connection between the hydrophones 113 and the input element 118.

Briefly, the operation in the control apparatus illustrated in FIG. 3 and described hereinabove is as follows: When the torpedo is launched the arming switch 29 is operated automatically whereby the several electron discharge devices included in the system are energized by the source 17 and the B voltage supply 31. Because of its negative buoyancy, the torpedo sinks and when it reaches a certain level, for example fifteen feet, the depth switch 27 operates and as a result the energizing circuits for the motors 11, 28 and 111 are closed. The control circuit for the vertical rudder 10 is now in operative condition and is effective to steer the torpedo horizontally in accordance with the difference in the signal intensities at the port and starboard hydrophones 13. The circuit for the upper and lower hydrophones 113 is disabled and, therefore, the gate relay 34 cannot be operated to disable the depth and trim controls irrespective of the signal field at the hydrophones. The elevator 110 therefore is under control of the depth, trim and follow-up potentiometers 32, 33 and 125, respectively and the torpedo is driven downwardly. When the torpedo reaches a certain depth, for example thirty feet, the ceiling switch 35 operates and the upper and lower hydrophones 113 are connected in circuit. If the signals received by these hydrophones 113 are below a predetermined level, the gate relay remains unoperated and the torpedo continues to travel downwardly to a greater preassigned depth, for example 45 feet and travels at this depth.

When the signal intensity at the hydrophones 113 reaches a preassigned level, the gate relay 34 operates to disable the depth and trim potentiometer controls so that the elevator 110 is placed under control of the hydrophones 113 and the associated circuit and is deflected to steer the torpedo vertically toward the source of the signals.

Advantageously, the signal level requisite for operation of the gate relay 34 may be made higher than that at which horizontal steering by the hydrophones 13 is initiated. In this case the torpedo is guided at the greater preassigned depth and approaches the signal source under control of the vertical rudder 10 and thus is brought close to the signal source before vertical steering by the elevator 110 under control of the hydrophones 113 is effected. This results in the direction of the torpedo to a position such that greater discrimination between the sonic signals in accordance with which the torpedo is to be guided and image signals resulting from reflections at the sea surface is realized.

If for any reason the torpedo should rise above a depth of 30 feet, for example, the sonic control circuit for the elevator 110 is disabled by the ceiling switch 35 and the torpedo is driven downwardly under depth and trim control until it is again below this level, whereupon the ceiling switch 35 operates again and the elevator 110 is brought under control of the hydrophones 113. It will be understood, of course, that the control of the rudder 10 in accordance with the signals received by hydrophones 13 continues at all depths.

The ceiling switch 35 is effective to prevent false steering of the torpedo due to reflections of the signals by the sea surface. This feature will be understood from the following considerations with particular reference to FIG. 2. In this figure, the submarine under attack is indicated at S, the sea surface is indicated at D and the torpedo is designated generally as B. The hydrophones 113a and 113b receive compressional wave signals resulting from sounds emanating from the submarine S, along paths indicated generally as P. Because of the diffraction pattern of the torpedo body, the signal intensity at the lower hydrophones 113b is greater than that at the upper hydrophone 113a, considering only signals received by the hydrophones directly from the submarine S. Because of reflections at the surface D, these hydrophones may receive other signal components which can be considered as having their source at an image S1 of the submarine S vertically aligned with the submarine and above the sea surface D a distance substantially equal to the depth of submersion of the submarine, the general path between the image S1 and the torpedo B being indicated by the line P1. As has been pointed out hereinabove, the elevator 110 is deflected in accordance with the difference in the signal intensities at the two hydrophones 113a and 113b. It will be seen that a condition may arise, particularly when the torpedo is launched at some distance from the submarine, where when the torpedo is traveling at a depth of submersion less than that of the submarine, the signal intensity at the upper hydrophone 113a, considering signal components due to both the submarine S and its image S1, may be greater than the signal intensity at the hydrophone 113b. Consequently, the elevator 110 would be deflected to steer the torpedo 10 upwardly toward the sea surface D instead of downwardly toward the submarine S.

The ceiling switch 35, as noted above, is effective to disable signal control of the elevator 110 whenever the torpedo is submerged to less than a preassigned depth, for example, 30 feet. Hence, should the torpedo be steered upwardly due to the action of the surface reflections above noted, when it reaches the prescribed level signal control of the elevator is disabled and, because of the operation of the depth and trim control potentiometers, the torpedo is steered downwardly toward the preassigned depth of level operation, for example 45 feet. As the torpedo approaches the vicinity of the submarine, under control to travel below a prescribed level, its distance from the submarine decreases more rapidly than its distance from the image so that the possibility of false operation of the elevator 110, due to reflections from the sea surface, decreases.

The depth at which the torpedo is to travel in the absence of sonic signal control will be set in accordance with a number of considerations. For example, if the torpedo is launched in regions where great water depths are known to exist, the level travel depth may be set at, for example, of the order of 200 feet so that when the torpedo is sufficiently close to the submarine under attack to result in operation of the gate relay 34 a great discrimination between the sounds emanating from the submarine S and those due to reflections from the sea surface will exist.

Referring now to FIG. 4, the vertical hydrophones 113 are connected alternately to the input element 118, and thence to the amplifier 119, by the commutator $26_1$ having a rotating contact 40 and two fixed contacts 41a and 41b connected to the hydrophones 113a and 113b, respectively. The rectifier 121 has its output connected to the rotating contact 42 of the commutator $26_2$, the latter having a pair of fixed contacts 43a and 43b. The rotating contacts 40 and 42 are revolved in synchronism, as by a suitable motor 39 coupled thereto, so that conductive paths are established alternately between the hydrophone 13a and the contact 43a and between the hydrophone 13b and the contact 43b.

The direct current amplifier 123 comprises a pair of similar electron discharge devices 45a and 45b each having a cathode 46, a control grid 47 and an anode 48. The two devices are connected for push-pull operation, the input circuit therefor including a pair of equal resistors 49 and the output circuit including balanced, differentially wound windings 50a and 50b of the relay 112. Grid bias and anode batteries 51 and 52, respectively, are provided as illustrated.

Connected across the contacts 43 and in series with each other are a pair of equal condensers 53a and 53b, one plate of each condenser being connected to the rotating contact 42 through a high resistance 54. The other plate of the condenser 53a is connected directly to the control grid 47 of the device 45a. The other plate of the condenser 53b is connected to a network comprising the follow-up, trim control and depth control potentiometers 125, 33 and 32, respectively. The potentiometers are connected in parallel with one another and a bias adjusting potentiometer 55 and battery 56. The contact arm of the bias potentiometer 55 is connected to the grid 47 of the device 45b by way of a high variable resistance 57, and the contact arms of the potentiometers 32, 33 and 125 are connected in parallel with one another to this grid, the gate relay 34 being in circuit with the contact arms of the depth control and trim control potentiometers 32 and 33, respectively. Variable resistances 65 may be associated with the potentiometers as shown. It will be seen, then, that the input circuit to the devices 45 comprises the branch composed of the condensers 53a and 53b in series with the potentiometer bank, connected across the terminals x and y of the input resistor 49.

As noted hereinabove, the hydrophones 113a and 113b are operatively connected in alternation to the respective contacts 43a and 43b by virtue of the operation of the commutators $26_1$ and $26_2$. As the rotating contact 42 revolves, charging circuits are closed alternately through the condensers 53a and 53b through the resistance 54. The capacitances of the condensers 53 and the magnitudes of the resistance 54 are made such that each condenser takes its full charge very quickly. For example, each condenser may have a capacitance of 0.02 microfarad and the resistance 54 may be of the order of 50,000 ohms. The input resistors 49 are of large magnitude, for example, of the order of 2 megohms each. Hence, the discharge circuit resistance for the condensers is great, so high that the condensers substantially hold the charges they receive, over the commutating cycle. The two condensers are charged oppositely so that the potential appearing across the two in series is at any instant the difference of the potentials across the condensers individually.

The charge received by each condenser is proportional to the output of the rectifier 121 at the time the condenser is connected operatively to the rectifier by the commutator $26_2$. The output of the rectifier 121, in turn, at any time is proportional to the output of the hydrophne 113a or 113b which is connected operatively to the amplifier 19 by the commutator $26_1$ at that time. Thus, the charging current supplied to the condenser 53a is proportional to the pick-up of the hydrophone 113a and the charging current supplied to the condenser 53b is proportional to the pick-up of the hydrophone 113b. The voltage across the terminals of the condensers in series, then, is proportional to the difference in the intensities of the signals picked up by the two hydrophones.

The automatic gain control 120 operates in accordance with the greater of the two hydrophone outputs to provide holdover and establish an average gain for the amplifier 119. Hence, the outputs of the two hydrophones 113a and 113b are combined by the condensers 53 on a relative rather than an absolute amplitude basis so that the requirements for the input circuit to the devices 45 are simplified.

The potential appearing at any instant across the terminals x, y of the input resistors 49 is related to the potential, at that instant, appearing across the terminals of the condensers 53a and 53b in series and varies in accordance with the relative intensities of the signals received by the two hydrophones. For example, if the signal received by the hydrophones 113a becomes greater than that received by the hydrophone 113b, the charge received by condenser 53a is greater than that placed upon condenser 53b. Hence, the potential of terminal y increases, as compared with the no signal condition, and that of the terminal x decreases proportioinately. Conversely, when the signal intensity at hydrophone 113b is greater than that at hydrophone 113a, the potential of terminal $x$ increases and that of terminal $y$ decreases proportionately. The output currents of the two electron discharge devices 45 vary, of course, in accordance with the potential variations across the terminals $x$ and $y$ and the currents through the windings 50$a$ and 50$b$ of the relay 12 vary in like manner. The armature 116 will be deflected in accordance with the difference in the currents in the two windings 50 to engage one or the other of the contacts 115$a$ and 115$b$. Thus, the armature is deflected in accordance with the difference in the intensities of the signals received by the two hydrophones 113.

If the hydrophone 113$a$ is the upper vertical hydrophone and the hydrophone 113$b$ is the lower, and the signal intensity at the hydrophone 113$a$ is the greater, the armature 116 will be deflected to engage the contact 115$a$, whereby the motor 111 will be rotated in the direction to produce up elevator, i.e., to steer the torpedo upwardly. Similarly, if the signal intensity at the hydrophone 113$b$ is greater than that at the hydrophone 113$a$, the armature 116 is deflected to engage the contact 115$b$, whereby the motor 111 is driven in the opposite direction to produce down elevator, i.e., to steer the torpedo downwardly. If the signal intensities at the two hydrophones are equal, and in the absence of other controls to be described hereinafter, the armature 116 remains in central position, the motor 111 is not energized and the torpedo continues traveling in its initial direction.

At noted heretofore, the input circuit for the direct current amplifier includes also, in series with the condensers 53, a potentiometer bank which comprises, inter alia, a follow-up potentiometer 125 mechanically coupled to the elevator 110. When the elevator is in its center position, the contact arm of the potentiometer 125 also is in its center position so that no potential due to this potentiometer appears in the direct current amplifier input circuit. However, when the elevator is deflected, the contact arm noted is moved off center to one side or the other and a potential is thus introduced in the input circuit. As will be apparent, the potential introduced in the input circuit by this potentiometer is related in polarity and proportional in magnitude to the deflection of the elevator so that this potentiometer tends to maintain balance in the input circuit of the direct current amplifier and produce a continuous steering of the torpedo when the elevator motor 111 is under control of the hydrophones 113 and to maintain the direction of travel of the torpedo when no signals are being received by the hydrophones or the signal intensity is below a prescribed level.

The potentiometer bank includes also the depth and trim control potentiometers 32 and 33, the latter, as described heretofore, being pendulum operated and the former hydrostatically operated and both being associated with the gate relay 34 which is controlled by the automatic gain control 120. As described heretofore, the gate relay is operated by the gain control to disconnect the depth and trim control potentiometers when the signals received by the hydrophones 113 are at least of a minimum prescribed intensity. When the signals are of less than this intensity, the gate relay remains closed and the trim and depth control potentionmeters control the potential appearing across the terminals $x$, $y$ to maintain the torpedo traveling at a pre-assigned depth, for example 45 feet below the sea surface.

Specifically, the depth control potentiometer 32 is so constructed that when the torpedo is at the prescribed depth of submersion, e.g. 45 feet, the contact arm of this potentiometer is at its center position so that no component of potential due to the potentiometer 32 appears across the terminals $x$, $y$ of the input resistors 49. If the torpedo rises above or sinks below this prescribed depth level, the contact arm of the potentiometer 32 moves off center, to one side or the other, and as a result, a component of potential is impressed upon the input circuit of the amplifier to unbalance it, the polarity of the unbalance as appearing across the input resistors 49 of the amplifier being dependent upon the direction of movement of the contact arm from its center position. The relay 112 operates in accordance with the direction of the unbalance to cause deflection of the elevator in the direction tending to bring the torpedo to the prescribed level and maintain it at this level.

The potentiometer 33 acts in a similar manner to maintain the trim of the torpedo at the prescribed depth. Specifically, it is so constructed that when the torpedo is level, the contact arm of the potentiometer is in its center position and, consequently, no component of potential due to this potentiometer appears across the resistors 49 in the input circuit of the amplifier 123. When the nose of the torpedo tilts upwardly or downwardly, this contact arm is moved off center, to one side or the other, by the pendulum and the resulting unbalance in the amplifier input circuit is such as to cause deflection of the elevator in the direction to counteract the tilt and return the torpedo to the level position.

It will be appreciated that the depth and trim controls are cooperatively associated at all depths at which they are operative. Thus, if the torpedo is at a different depth than that corresponding to the center position of the contact arm of the potentiometer 32 and is level, the elevator is deflected, due to the unbalance in the control circuit therefor because of the off-center position of the contact arm noted, to steer the torpedo toward the prescribed depth. For example, if the torpedo is level at a depth above that prescribed, the elevator 110 is deflected to steer the torpedo downwardly. Hence, the nose of the torpedo is tilted downwardly and the trim control potentiometer 33 is operated immediately, even before any substantial change in the depth of the torpedo has occurred. The sense of the action of the trim control potentiometer is such as to bring the elevator 110 back toward neutral until neutral elevator is obtained at a diving angle dependent upon the variation of the torpedo depth from the prescribed level. As the prescribed depth is approached, the diving angle decreases accordingly. Thus, stable steering of the torpedo to the prescribed depth is realized inasmuch as the diving angle is varied and controlled as described.

The sensitivities of the several elevator controls may be adjusted to any desired relation. Specifically, the sensitivities of the follow up, trim and depth controls may be adjusted by variable resistances 65, the signal control sensitivity may be adjusted by arranging the resistance 54 as a potentiometer, and the bias sensitivity may be adjusted by way of a variable resistance 57. Although the several resistances noted have been shown as variable in FIG. 4, it will be understood, of course, that the parameters thereof requisite to provide the desired sensitivities may be predetermined and fixed resistances utilized in an actual device.

The stringency of design requirements for the relay 112 may be reduced by employing auxiliary relays 59$a$ and 59$b$ in the supply circuits for the motor 111, these relays being operated in accordance with the direction of deflection of the armature 116. That is, when the armature 116 engages the contact 115$a$, the relay 59$a$ operates to close the supply circuit from the source 17 to the motor 111 by way of the contact 60$a$, whereby the motor is rotated in one direction; when the armature 116 engages the contact 115$b$, the relay 59$b$ operates to close the supply circuit to the motor by way of the contact 60$b$ whereby the motor rotates in the opposite direction.

If desired, and particularly in cases where the circuit and motor constants are such that overshooting in the elevator operation may occur, damping or feedback may be provided to control the input circuit of the direct current amplifier to provide for quick initial operation of the motor 111 and for damping increasing as the elevator approaches the position requisite to steer the tropedo toward the source of the signals or compressional waves. In one form, the damping or feedback circuit includes a fixed high resistance 61 bridged by a condenser 62 and connected between the mid-point of the battery 56 and the contact 43b. The other end of the resistance 61 is adapted to be connected to the opposite ends of the battery 56 by way of high resistances 63 and auxiliary contacts 64a and 64b on the relays 59a and 59b, respectively. The condenser 62 is thus charged in the direction at any instant depending upon which of the contacts 64a or 64b is closed to impress a corresponding potential upon the input circuit of the direct current amplifier. The time constant of the damping or feedback circuit is dependent, of course, upon the capacitance of the condenser 62 and may be adjusted to a desired value by varying the capacitance of the condenser. In general, the larger the capacitance of the condenser, the more sluggish is the feedback action. It will be appreciated that the sense and magnitude of the feedback is such that as the elevator aproaches the position called for by the various controls, a balance in the potential at $x$ and $y$ is reached too soon. This causes relay 112 to release, stopping the motor and removing the feedback potential. As the potential is now unbalanced, relay 112 closes again and moves the motor forward, and the process is repeated. The final position is thus approached in a series of pulses, and when it is reached the elevator continues to oscillate in a small range about this position.

The system illustrated in FIG. 4 has been described for operation of the elevator to steer the torpedo vetrically. Of course, a similar system may be utilized to control the rudder 10 to steer the torpedo horizontally. In a rudder control system, the ceiling switch and the depth and trim control potentiometers and the associated gate relay would be omitted.

It will be appreciated that all the signals in accordance with which the elevator or rudder deflections are controlled are applied to the input circuit of the direct current amplifier 123 by way of a common element, the input resistor 49. Thus, a structurally simple and compact control system for the rudder or elevator is provided and all of the control signals present at any time are resolved conjointly into a single resultant in accordance with which deflection of the elevator or rudder is effected. Further, it will be appreciated that the direct current amplifier and differential relay combination provides very sensitive control of the elevator and rudder in accordance with the control signals. In one typical system, for example, the relay 112 is responsive to changes in the output of the amplifier 123 resulting from a change of 0.1 volt in the potential across the terminals $x$, $y$ of the input resistor 49.

Although a specific embodiment of this invention has been shown and described, it will be understood that it is but illustrative and that various modifications may be made therein without departing from the scope and spirit of this invention as defined in the appended claims.

What is claimed is:

1. A signal controlled steering system for a moving body, comprising a rudder, driving means for deflecting said rudder in opposite directions, relay means for controlling said driving means to determine the direction of deflection of said rudder thereby, and energizing means for said relay means including a direct current amplifier having an output circuit including said relay and having a control electorde, an input circuit including said electrode and a resistance for determining the potential of said electrode, and control means for varying the potential across said resistance proportionately to signals in accordance with which the rudder is to be deflected.

2. A signal controlled steering system for a moving body, comprising a rudder, driving means for deflecting said rudder in opposite directions, an energizing circuit for said driving means, and means for controlling said energizing circuit to determine the direction of deflection of said rudder by said driving means, said controlling means comprising a relay having contacts operatively associated with said circuit, and having a pair of differentially related energizing windings, a push-pull, direct current amplifier the output circuit of which includes said windings and the input circuit of which includes a resistance, and means for varying the amplitude and polarity of the potential across said resistance in relation to signals in accordance with which the body is to be steered.

3. A signal controlled steering system for a moving body, comprising a rudder, a reversible motor for deflecting said rudder in opposite directions, a supply source for said motor, and means for controlling the association of said supply source with said motor thereby to determine the direction of deflection of said rudder by said motor, said means comprising a relay having an energizing element and a pair of contacts constructed and arranged in association with said source so that when one contact closes the motor operates in one direction and when the other contact closes the motor operates in the opposite direction, a direct current amplifier having an output circuit including said energized element and having an input circuit including control electrode means and a resistance for determining the potential impressed upon said control electrode means, and means for varying the potential across said resistance in relation to signals in accordance with which the body is to be steered.

4. A signal controlled steering system for a moving body, comprising a rudder, a reversible motor coupled to said rudder, a supply source for said motor, and means for controlling the association of said motor with said source to determine the direction of operation of said motor, said means comprising a relay having an armature, a pair of contacts and a pair of differentially related energizing windings, said contacts being constructed and arranged in association with said armature and source to define a reversing switch determining the direction of operation of said motor in accordance with the position of said armature, a direct current amplifier comprising a pair of similar electron discharge devices connected in push-pull relation and each having a control electrode and an output electrode, each of said windings being connected in circuit with a corresponding output electrode, an input resistor connected between the control electrodes of said devices, and means for varying the potential across said resistor in accordance with signals in accordance with which the body is to be steered.

5. A signal controlled steering system for a torpedo comprising a rudder, a pair of signal translating devices, means for deflecting said rudder in accordance with signals received by said devices to steer the torpedo toward the source of the signals, means for steering said torpedo along a prescribed course when the intensity of said signals at said devices is below a preassigned level, and means for disabling said steering means whenever the intensity of said signals at said devices is at least as great as said preassigned level.

6. A signal controlled steering system for a torpedo comprising a rudder arranged to steer the torpedo vertically, means for controlling said rudder in accordance with signals emanating from an object to guide the torpedo toward said object, means for maintaining said torpedo traveling at a prescribed depth when said signals received by said controlling means are below a preassigned intensity level, and means for disabling said maintaining means whenever said signals are above said preassigned level.

7. A signal controlled steering system for a torpedo comprising a rudder arranged to steer the torpedo vertically, signal translating means, means for deflecting said rudder in accordance with signals received by said translating means to steer the torpedo toward the source of said signals, and means for disabling said deflecting means whenever the torpedo is above a preassigned depth of submersion.

8. A signal controlled steering system for a torpedo comprising a rudder arranged to steer the torpedo vertically, signal translating means, means for deflecting said rudder in accordance with signals received by said translating means to steer the torpedo toward the source of said signals, means for guiding said torpedo at a preassigned depth of submersion when the signals received by said translating means are of less than a prescribed level, means for disabling said guiding means when the signals received by said translating means are at least as great as said prescribed level, and means for disabling said deflecting means whenever said torpedo is submerged to less than a second preassigned depth.

9. A steered moving body comprising a rudder, signal translating means, means for deflecting said rudder, means for controlling said deflecting means in accordance with signals received by said translating means from an object to guide the body toward said object, and means for adjusting said controlling means in accordance with deflections of said rudder to steer said body continuously toward said object.

10. A torpedo comprising a rudder, driving means for deflecting said rudder in opposite directions, control means for said driving means to determine the direction of deflection of said rudder, signal translating means, means for operating said control means in accordance with signals received by said translating means from an object to steer the torpedo toward said object, hydrostatically controlled means for operating said control means to maintain the torpedo traveling at a prescribed depth, and means for disabling said hydrostatically controlled means when the signals received by said translating means are above a preassigned level.

11. A torpedo comprising a rudder for steering the torpedo vertically, means for deflecting said rudder in opposite directions, means for actuating said deflecting means, a control circuit for said actuating means, signal translating means, means for energizing said control circuit in accordance with signals received by said translating means from an object to steer the torpedo toward said object, a potentiometer in said control circuit, means for adjusting said potentiometer in accordance with the depth of submersion of the torpedo to maintain the torpedo at a preassigned depth of submersion in the absence of signals at said translating means, and means for disabling said adjusting means when the signals received by said translating means are above a prescribed intensity.

12. A torpedo in accordance with claim 11 comprising a second potentiometer in said control circuit, and means for adjusting said second potentiometer to maintain the trim of said torpedo at said preassigned depth.

13. A torpedo comprising a rudder, means for deflecting said rudder in opposite directions, means for determining the direction of movement of said rudder by said deflecting means, a resistance, means for operating said determining means in accordance with the polarity of the potential across said resistance, a pair of signal translating devices, means for resolving the outputs of said devices into a potential across said resistance and of a polarity determined by the relative intensities of the signals received by said devices, and means for varying the potential across said resistance proportionately to deflection of said rudder.

14. A torpedo comprising a rudder arranged to steer the torpedo vertically, means for deflecting said rudder in opposite directions, control means for said deflecting means including a resistance the polarity of the potential across which determines the direction of deflection of said rudder by said deflecting means, signal translating means, means for resolving the output of said translating means into a potential impressed across said resistance, a source of potential and a potentiometer in circuit with said resistance, the potentiometer being arranged to vary the amplitude and polarity of the potential due to said source impressed across said resistance, hydrostatically operated means for adjusting said potentiometer to maintain said torpedo traveling at a preassigned depth when the signal intensity at said translating means is below a prescribed level, and means for disabling said hydrostatically operated means when said signal intensity is at least as high as said level.

15. A torpedo in accordance with claim 14 comprising means for disabling said translating devices whenever the torpedo is submerged to less than a second preassigned depth.

16. A torpedo in accordance with claim 14 comprising a second potentiometer in shunt with said first potentiometer and pendulum-controlled means for adjusting said second potentiometer in response to tilting of the torpedo.

17. A torpedo comprising a rudder adapted to steer the torpedo vertically, means for deflecting said rudder in opposite directions, relay means controlling said deflecting means to determine the direction of deflection of said rudder, an energizing circuit for said relay means comprising a source, a pair of potentiometers connected in parallel with each other and said source and a resistance, a pair of signal translating devices, means including an input element associated with said devices for resolving the outputs of said devices into a potential across said resistance, hydrostatically operated means for adjusting one of said potentiometers in accordance with the depth of submersion of said torpedo and constructed and arranged to establish no potential across said resistance by said source when the torpedo is submerged to a preassigned depth, pendulum means for adjusting the other of said potentiometers in accordance with tilting of the torpedo, and means for disabling said potentiometers whenever the intensity of said signals is above a prescribed level.

18. A torpedo in accordance with claim 17 comprising means for operatively disconnecting said devices from said input element whenever the torpedo is submerged to less than a second preassigned depth.

19. A torpedo in accordance with claim 17 comprising a third potentiometer in parallel with said pair of potentiometers, and means for adjusting said third potentiometer proportionately to the deflection of said rudder.

20. A torpedo comprising a rudder, reversible driving means for deflecting said rudder in opposite directions, a relay having a pair of contacts and an armature associated therewith, an energizing circuit for said driving means including said contacts, said circuit being arranged to cause energization of said driving means in one direction when one of said contacts is engaged by said armature and to cause energization of said driving means in the opposite direction when the other of said contacts is engaged by said armature, an energizing circuit for said relay including a direct current amplifier, said amplifier having an input circuit including a biasing resistance, a pair of signal translating devices, and means for resolving the outputs of said devices into a direct current potential across said resistance related in amplitude and polarity to the difference in said outputs.

21. A torpedo in accordance with claim 20 comprising means for varying the potential across said resistance in accordance with the direction and amplitude of deflection of said rudder.

22. A torpedo in accordance with claim 20 wherein said rudder is arranged to steer the torpedo vertically and comprising hydrostatically operated means for varying the potential across said resistance to maintain said torpedo traveling at a preassigned depth, and means for disabling said hydrostatically operated means whenever the outputs of said devices are above a prescribed level.

23. A torpedo in accordance with claim 20 wherein said rudder is arranged to steer the torpedo vertically and comprising means for disabling said resolving means whenever the torpedo is submerged to less than a preassigned depth.

24. A torpedo in accordance with claim 20 wherein said rudder is arranged to steer the torpedo vertically and comprising means for controlling the potential across said resistance in accordance with the depth of submersion of the torpedo to maintain the torpedo traveling at a preassigned depth, means for varying the potential across said resistance to maintain the trim of the torpedo at said preassigned depth, and means for disabling said potential controlling and potential varying means whenever the outputs of said signal translating device are above a prescribed level.

25. A torpedo in accordance with claim 20 comprising a pair of potentiometers is circuit with said resistance and each effective to vary the potential thereacross, hydrostatically operated means for actuating one of said potentiometers to maintain said torpedo traveling at a preassigned depth, pendulum controlled means for actuating the other of said potentiometers in accordance with tilting of the torpedo, and means for rendering said potentiometers ineffective whenever the outputs of said translating devices are above a prescribed level.

No references cited.

BENJAMIN A. BORCHELT, *Primary Examiner.*

BURNHAM YUNG KWAI, *Examiner.*